Feb. 15, 1966 S. N. PORTER ETAL 3,235,716
DATA ENTRY CHECKING APPARATUS
Original Filed Nov. 13, 1958 4 Sheets-Sheet 2

INVENTORS:
Sigmund N. Porter
Robert M. Tink

By Louis A. Kline
John J. Matlago
Their Attorneys

Feb. 15, 1966 S. N. PORTER ETAL 3,235,716
DATA ENTRY CHECKING APPARATUS
Original Filed Nov. 13, 1958 4 Sheets-Sheet 3

INVENTORS:
Sigmund N. Porter
Robert M. Tink
Louis A. Kline
John J. Matlago
Their Attorneys

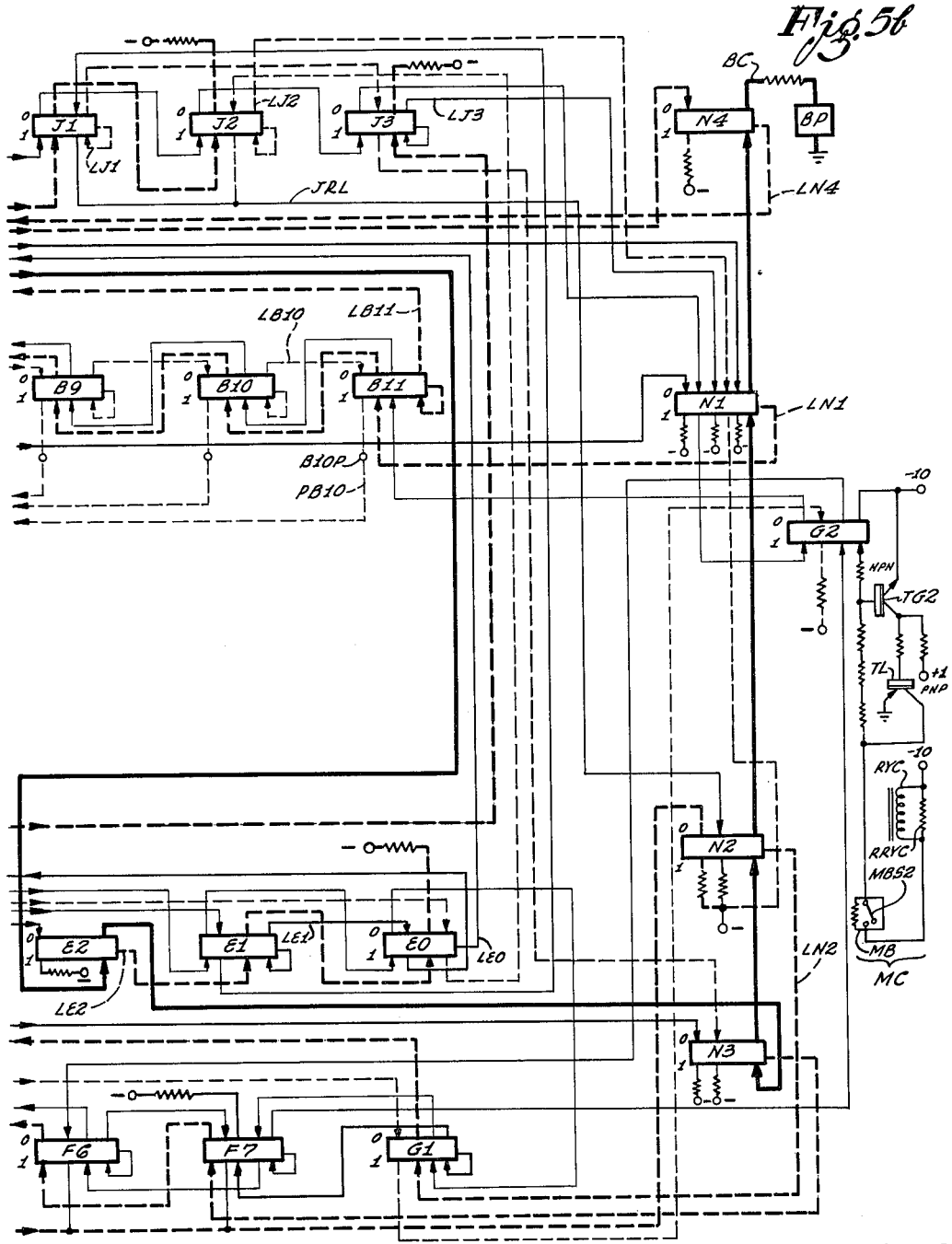

3,235,716
Patented Feb. 15, 1966

3,235,716
DATA ENTRY CHECKING APPARATUS
Sigmund N. Porter, Los Angeles, and Robert M. Tink, Redondo Beach, Calif., assignors to The National Cash Register Company, Dayton, Ohio, a corporation of Maryland
Continuation of application Ser. No. 773,761, Nov. 13, 1958. This application Dec. 5, 1961, Ser. No. 158,934
10 Claims. (Cl. 235—153)

This invention is a continuation of patent application, Serial No. 773,761, filed November 13, 1958, and relates to apparatus for detecting an erroneous data-entry into a data-receiving system to which data are supplied from number-storage means such as a keyboard upon which the data are entered normally by manual operations and with the data normally in numerical or alphanumerical form conforming to a prescribed and predetermined rule or composition. Briefly stated, the invention contemplates an organization of groups of units, each unit comprising a storage means capable of storing indefinitely the power to control an operation of one or more similar units and capable of transferring that power upon call, the groups of units having respective broad control of series of operations of units, the organization cooperating with means in which a plural-digit number is stored, and acting to automatically perform mathematical operations according to a congruence prescription to which the stored number is presumed to conform, whereby if the number does so conform an indication thereof is produced and if the number fails to so conform, a different indication is produced. In general, the congruence relationship is defined in terms of a summation of the numerical results of separate mathematical operations upon each of the individual digits of the number, to a prescribed modulus. The congruence relationship is so designed and defined that common forms of erroneous entries of numbers in such number storage means as machine keyboards are detected with various degrees of efficiency.

A typical data receiving system of the type previously mentioned is an accounting machine having a keyboard comprising an array of keys, at least some of which are assigned particular individual data-entry functions represented or representable by respective numerical values. A typical type of data normally entered on the keyboard of such a machine is that generally termed "account numbers," the numbers each comprising a plurality of digits of such relative values that the entire account number conforms to a predetermined mathematical rule or prescription. Account numbers of the type mentioned are employed, for example, as identification numbers to identify or designate specific respective commercial accounts. It is apparent that accuracy in entering such numbers or data on the keyboard input means of an accounting or data-processing machine is of great importance so that debits, credits, and similar data are associated on the record with the right client or party; and accordingly it is evident that there is a need for apparatus that will check or test conformity of such entries with the prescription or rule and give immediate indication of nonconformity.

The present invention anticipates the previously indicated need by providing apparatus which will, if permitted to do so, within a few milliseconds of time following completion of entry of a multi-digit information number or identification data item, indicate conformity or non-conformity of the entry with a particular prescription to which all acceptable information numbers or identification items conform. While the invention is not limited to operation with information-number systems alone, it will for the sake of conciseness of disclosure be described in connection with a preferred physical embodiment wherein the information data bits comprised in any identification data are each either an alphanumeric character or representable by such a character within the confines of the applicable rule to which all the identification items conform. Additionally, the specific exemplary form of the apparatus will, for the sake of simplicity and conciseness of disclosure, be chosen to be operable with the identification data represented in numerical form within the limits of the decimal system and operable to check entries of such plural-digit identification numbers as conform to a particular and specific exemplary mathematical prescription. As will hereinafter be made evident, the concept of the invention is not limited to the particular preferred embodiment of apparatus chosen for descriptive illustration of the principles of the invention, nor to the particular exemplary mathematical prescription employed in explaining the invention.

The exemplary apparatus utilizes individual entries of the respective digits of a plural-digit identification number, as manifested or stored by respective closures of key-operated switches, each of which is associated with and operated only by a respective individual key of a keyboard. Normally, but not necessarily, such keys are arranged in a matrix of rows and columns of keys, each key in a given column representing a single respective numerical digit and the respective columns representing the different orders of decimal values; and that particular arrangement of keys and key-operated switches will, for the sake of convenience, be used in the present illustration of the invention. In such an embodiment, keys are successively depressed in entering an identification number, followed by depression of a "motor bar" or operation-initiating key. Depression of the latter key is in the example utilized to initiate operation of apparatus pertaining to the invention, for performance of the test for compliance. If the test results in an indication of conformity of the entered number with the prescription, the machine is allowed to continue through the complete cycle of operations. If the test is unsuccessful, that is, indicates non-conformity of the entered number with the prescription, the apparatus according to the invention prevents completion of the cyclical operation of the machine and, preferably, also initiates or furnishes visual and/or aural indication of the commission of an error in number entry.

It will be appreciated that if the principles of the invention are applied to other embodiments of keyboards (such as, for example, the so-called "living" keyboard which comprises but ten character keys), conventional indication-storage means are interposed between the key means and the apparatus of the present invention, so that the latter apparatus may operate successively and/or repetitively on any stored digit indication corresponding to any respective arithmetical order (e.g. decimal order) of the digits entered by or upon the storage means. This will be explained in greater detail subsequent to the description of the preferred exemplary embodiment of apparatus chosen to illustrate the principles of the invention, in which embodiment of apparatus use is made of switch means each operable by or in response to actuation of a respective key of an array of rows and columns of keys.

From the preceding it is evident that it is an important object of the invention to provide means for testing number entries in a data input or storage device, for conformity with a predetermined mathematical prescription or rule, without interference with the normal operation of other devices or apparatus associated with the device.

Another object of the invention is to provide a simple, compact, rapidly operating data-entry testing apparatus for use with keyboard-input data processing machines.

Another object of the invention is to provide an apparatus adaptable to test information number entries on a keyboard-input means for conformity with any specified one of a plurality of mathematical prescriptions or rules.

Another object of the invention is to provide an information-entry testing apparatus which is comprised largely of substantially identical operating units which are "solid-state" devices occupying but a very small space and using a negligible amount of energy for operation.

The above stated objects and advantages are attained by the present invention, which is illustrated in principle by the preferred physical embodiment hereinafter explained in detail and diagrammatically depicted in the accompanying drawings, in which.

Figure 1:
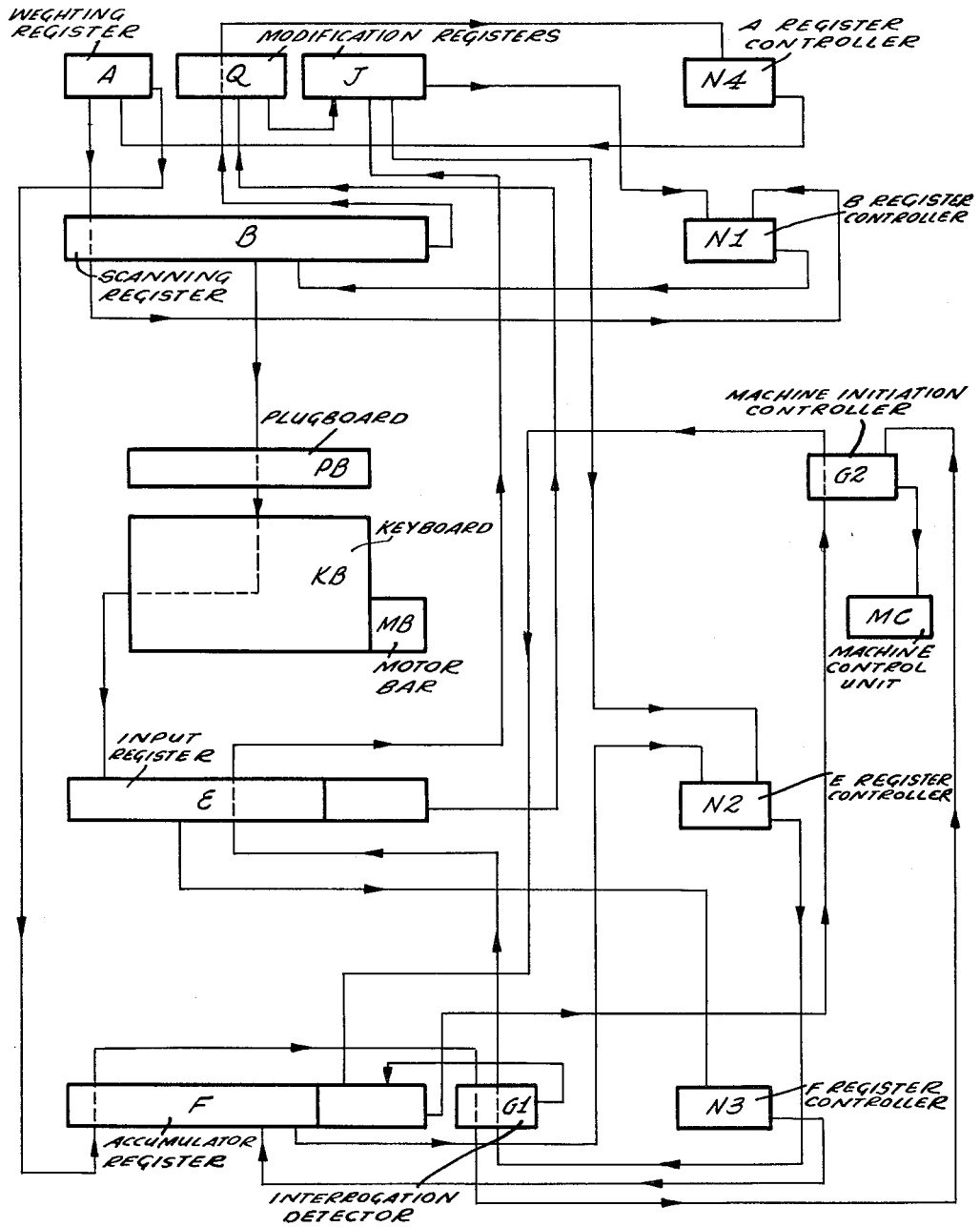
FIG. 1 is a block diagram indicating principal functional groups of apparatus units and components, and indicating lines of control exercised between and among the groups of apparatus.
Figure 2:
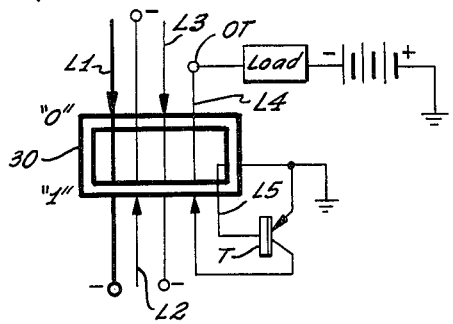
FIG. 2 is a stylized diagram illustrating a typical basic solid-state operating unit of the type used both singly and in combinations in the exemplary apparatus.
Figure 3:
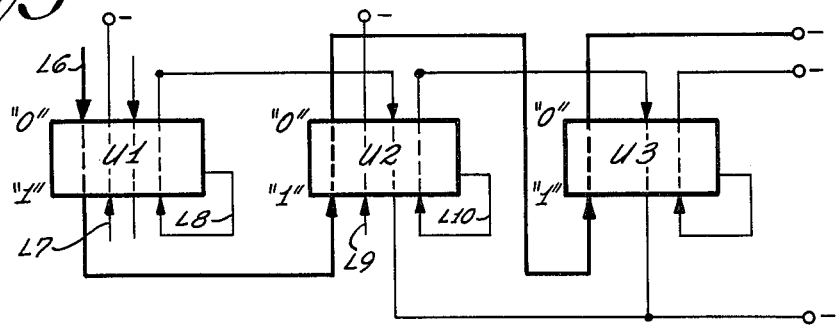
FIG. 3 is a simplified stylized diagram illustrating a concatenation of intercalated operating units of the type depicted in FIG. 2, arranged in circuits to perform transfer-of-control functions.
Figure 4:
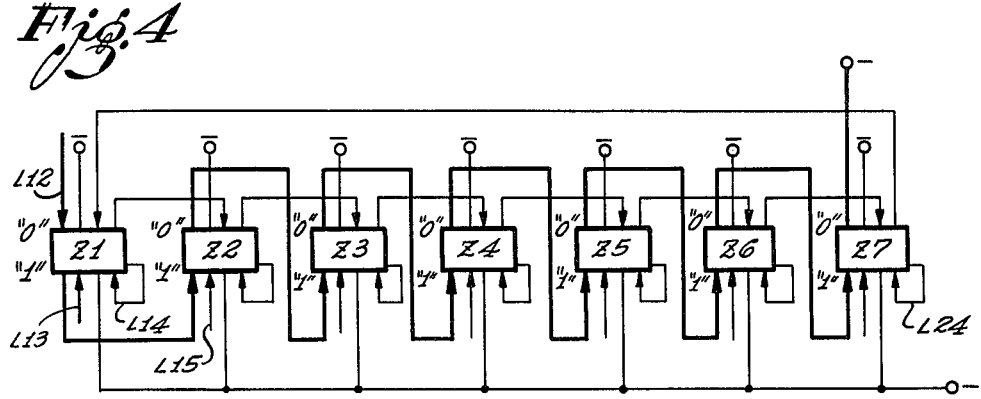
Figure 5A:
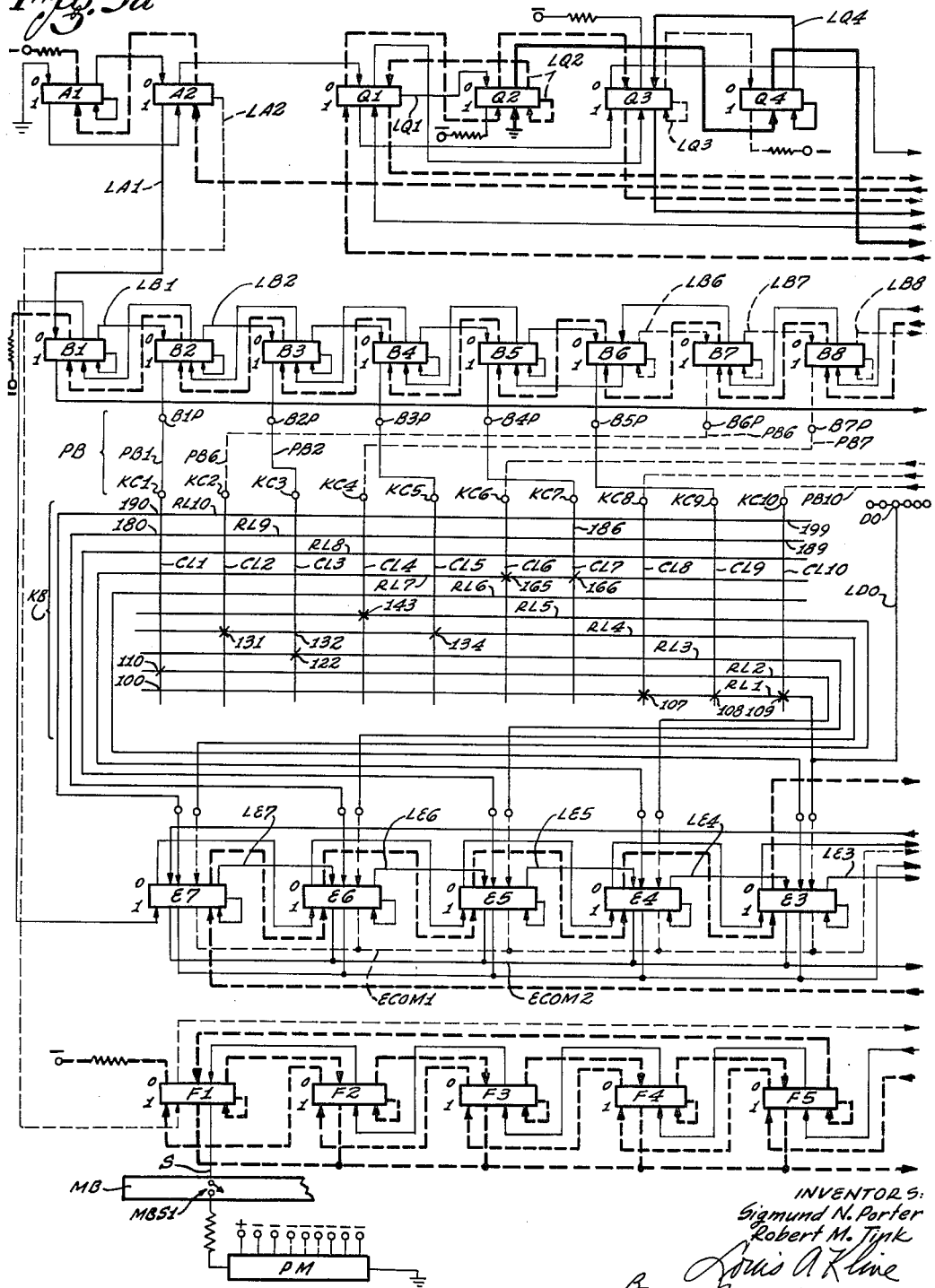

FIG. 4 is a diagram similar to that of FIG. 3, indicating how a plurality of operating units of the type depicted in FIGS. 2 and 3 may be employed as a recirculating single-digit register operable to perform arithmetical counting (accumulating) and dividing functions; and FIGS. 5a and 5b are juxtaposable parts of a stylized schematic and circuit diagram indicating circuit connections and operating units conforming to the diagram of FIG. 1.

It is now well known in the data-processing and allied arts to which the present invention relates that information or data may be represented in binary form, and that storage of the information in binary bit form may be accomplished by representing each of the two possible forms or values of binary bits by respective ones of the opposite stable states of a bistable device. One well-known type of bistable device capable of ready and rapid change from either state to the other and readily adapted to electronic circuit usage is in the form of a magnetic core. Detailed information in respect of the composition, construction, and general characteristics of such magnetic cores is disclosed in, for example, Journal of Applied Physics, vol. 21, No. 1, pages 49–54 and vol. 22, No. 1, pages 44–48, and in the patent literature relating to digital computer memory devices. A first remanent magnetic state of such a core is considered to represent, and is used to store, a binary representation or bit; while the second and opposite state is considered to represent and store an indication of absence of a bit represented by the first state. The two stable states of the core are accordingly commonly symbolically represented by "1" and "0," respectively; and since in the exemplary embodiment of apparatus, bistable magnetic cores are employed as storage devices for storing digits or control-function capabilities, the stated symbolic representation will herein be used.

In the exemplary form of apparatus herein described, unique solid-state operating units are employed in some instances for storing binary information, and in other instances are arranged to store a potential ability either to exercise a control function or to transfer the capability from one unit to one or more other units. The units may be similar or substantially alike, irrespective of which general class of use is assigned; and this fact, among others, permits a considerable reduction in cost and complexity of the apparatus. With reference to FIG. 2, a bistable magnetic core is schematically depicted and designated by numeral 30. The core is depicted as rectangular in outline for a purpose presently to be made evident, but it may be of any suitable physical shape. Conductive insulated windings, such as L1, L2, L3, L4, and L5, are each inductively linked with the core by being wrapped around a portion thereof, or in any other way. For example, the windings or "coils" may merely consist of a single pass of the respective conductors through the central opening of the core, as shown. Each and any of the windings is capable of carrying an electric current of magnitude sufficient to coerce the core from one remanent state to the other, depending upon the direction of the current. As above indicated, the opposite remanent states of the core may be symbolically represented by "0" and "1," and in connection with usage of that convention herein, it is to be noted that a current coursing a winding such as L1, in the "downward" direction indicated by the arrow point, will be considered to tend to coerce the core to "1" whereas a current coursing a winding in the "upward" direction indicated at winding L2 will tend to coerce the core to "0." The states of the core are symbolically indicated by "0" and "1" applied at the upper and the lower edges, respectively, of the rectangle, as depicted; hence hereinafter it will be considered that a current directed through a lead passing into and out of a core (rectangle) in the direction indicated by an arrow point will tend to coerce the core to that state indicated at the edge of the rectangle opposite the arrow point. For example, the "downwardly" directed current coursing winding L1 in the direction of the arrow point tends to coerce core 30 to "1," while an "upwardly" directed current, such as that indicated as coursing through winding L4, tends to coerce core 30 to "0." Hereinafter the "1" state will be considered to be the active state of a core, wherein the core is storing a binary digit one, or is storing an ability to perform a control function; and the "0" state will be considered to be that state of a core wherein the core is storing a binary zero, or will lack ability to perform a control function. Also, reference to a current or an electric pulse passing "upwardly" or "downwardly" through a schematically represented winding will be subject to the above stated interpretation.

Continuing reference to FIG. 2, core 30 has associated therewith a transistor, T, which in this case is of the PNP class but may be in other cases of the NPN type. Core 30, transistor T, and windings inductively linked to the core comprise the essential elements of any of the heretofore mentioned "units" which in the invention are employed for storage and/or control functions. The PNP transistor is connected as indicated, with emitter grounded and the base-emitter circuit including a core winding, L5. Also, the collector is connected to one end of a core winding, L4, the other end of which is connected to an output terminal, OT. The connections are such that with the core in "1" state an upwardly directed current in, for example, L2, would commence coercion of the core to "0" and a potential would be induced in winding L5 of proper polarity to bias the transistor to the conductive condition. If the core were already in "0" state, no potential would be generated and the transistor would remain non-conductive. A downwardly directed current, whether it acts to coerce the core from "0" to "1" or merely leaves the core in "1" state, does not initiate transistor conduction, since any potential thus generated in L5 is of the wrong polarity to trigger the transistor and only adds to the normal back-bias tending to prevent conduction. Thus it is evident that the only time the transistor conducts or "fires" is when the core is in the "1" state and an upwardly directed current courses through a winding. Also it is evident that when the transistor conducts, the collector current, coursing upwardly through winding L4, aids in reversing the state of the core from "1" to "0"; and that current, as indicated, is employed to operate a load. The load may be a winding on another core whereby the other core may be reversed in state, or the load may comprise more than one winding each linked to a respective core, so that any or all of a plurality of cores may be reversed in state by the collector current or "pulse" of a single transistor. In these operations a digit "one" may thus be transferred from one core to another or to others, or an ability to perform a control function may thus be transferred, within an extremely short interval of time. The above described operations are employed in the present invention in manners and for reasons presently to be made evident.

One way the above detailed operations of core-and-transistor units are employed is to form or provide a register in which a single binary digit is stored and successively is shifted from one unit to the next. Such action is next described herein, the reference to FIG. 3. The latter figure shows three of the aforedescribed core-and-transistor operating units, U1, U2, and U3, depicted in a simplified diagrammatic representation using the previously defined symbolic conventions. In this simplified representation a rectangle alone is used to represent a core and its associated transistor, the base-emitter circuit being not shown and the collector lead shown as extending out of the right-hand end of the rectangle. Assuming the cores of all three of the units to be in "0" state, the core of U1 may be coerced or "set" to "1" state by a downwardly directed pulse through conductor L6. The setting pulse, which preferably is of unusually long duration, also courses upwardly through windings linked to the cores of U2 and U3, respectively, and hence does not affect those cores but insures that they both reside in "0" state. The setting pulse is of duration sufficient that no transistor output pulse will be effective to change the desired effect of the setting pulse. The setting pulse thus enters a binary bit or "one" into unit U1 of the register as U1 is driven to "1." A subsequent upwardly directed pulse coursing winding L7 triggers the transistor of unit U1 into conduction, and the resulting collector pulse courses through L8 and aids in reversing or "turning over" the core of U1 to "0"; and, coursing downwardly through a winding linked to the core of unit U2, drives that core from "0" to "1." The binary bit or digit is by those actions transferred from U1 to U2. A subsequent upwardly directed pulse passing through winding L9 triggers into conduction the transistor of unit U2, and the resultant collector pulse aids in returning unit U2 to "0" and drives unit U3 to "1." As previously noted the transistor and certain connections are omitted in the diagrammatic representation employed in FIG. 3. This is done in the interest of simplicity in the drawing; and with FIG. 2 as a guide in detail, the nature of the actual structure and connections is obvious. In FIG. 3 the "load" which is driven by the transistor of unit U1 is a winding on the core of unit U2. It is to be noted that the setting pulse passed through L6 puts unit U1 into a state of preparation to thereafter control an action or function of unit U2. Similarly, the pulse through L8 from the transistor of unit U1 effects a transfer of this control-function ability from U1 to U2. The transistors pass collector currents as brief electric pulses, since transistor excitation endures only during reversal of state of the associated core. The potentials for inducing electron- flow are supplied by conventional means, indicated only as terminals. The transistors will hereinafter be designated by the character T, followed by the designation of the associated unit; for example: TU1, the transistor of unit U1. Also, the simplified schematic representation of the core-transistor-windings units as used in FIG. 2 will be employed in succeeding explanations of other details and operations according to the invention.

FIG. 4 depicts the electrical interconnections of a plurality of the aforedescribed operating units to form a single-digit recirculating register. Therein the connections provide for initial entry of a binary digit one into unit Z1 by a pulse coursing through setting lead L12. That pulse courses windings linked to respective ones of the other units cores, assuring their residence in the "0" state. A pulse through L13, supplied from any controlled source and directed as indicated, initiates transfer of the digit from Z1 to Z2 by operation of the TZ1 pulse through lead L14 and in a now evident manner, after which a pulse through L15 initiates transfer of the digit from Z2 to Z3. The digit shift control pulses passed through L13 and L15 are supplied by means or units external to the register, as will hereinafter be made evident. The action continues as digit-transferring pulses are successively applied in turn to appropriate windings in units Z3, Z4, etc. until the digit resides in Z7 and an upwardly directed pulse is applied to that unit. The collector pulse from TZ7, coursing through lead L24, is directed downwardly through a winding linked to the core of unit Z1; thus at the seventh shift the digit is transferred from Z7 to Z1. It is evident that if each of the successively applied digit shifting pulses represents an addition of the numerical value one to an accumulation of ones, the register may serve as an accumulator; and since as many of the operating units Z1, Z2, etc. may be included in the register as may be desirable, the accumulator may be constructed to contain as large an accumulation as may be necessary. Further, it is evident that each time the shifted digit is transferred from the last unit back to the first unit the net arithmetical result is the division of the accumulation in the register by the number of operating units in the register. Use is made of this feature in a more complex form of such a register, in the present invention. Also, other combinations of the described operating units are employed for counting, weighting control, and other functions. In general, pulses of electric current are passed through the proper winding or windings to "set" (coerce to "1") and to "reverse" (return to "0") cores of the units. However, in certain instances some cores are normally biased to "0" state by a steady electric current coursing respective bias windings; and in those instances the windings and pulses are such that a pulse in the setting (downward) direction has the effect of only temporarily driving the core to "1" and the bias current immediately thereafter forces return of the core to "0." It should be noted that it is incident to the return of a core to "0" from "1" state that a transfer of an ability to control or the shift of a digit occurs. Power-supplying means may be of conventional type, and means for forming action-initiating pulses will hereinafter be described.

In FIG. 1 there is depicted diagrammatically a typical functional organization of major groups or classes of apparatus components, as employed in the exemplary physical embodiment according to the invention. For the sake of convenience, several of the various groups of components comprising one or more of the previously described units will hereinafter be termed "registers." Indicated in FIG. 1 are A, Q, J, B, E, F, G1, G2, N1, N2, N3, and N4 registers, each comprising at least one core-transistor-windings operating unit of the previously described character. Some of the registers may be divided into parts and one unit of each part made to comprise a set of units. Auxiliary to the registers is a plugboard (optional), a machine-control unit MC, and electric switches or other digit value storage means associated with keys of a machine keyboard KB having a motor bar or operating key MB. The designated apparatus groups are depicted in block or rectangle form, and functional controls exercised by one group (or part thereof) upon another apparatus group are indicated by lines extending between the respective blocks; arrow points indicating the direction of exercise of a control upon one group (or part thereof) by another. Certain of the functional controls will be noted to extend from one group to more than a single other group of apparatus, this being indicated by the control line extending through one or more groups. Also, it may be noted that only the principal functional controls are indicated. The natures and purposes of the several controls will hereinafter be made clearly evident in connection with an explanation of details of the combinations and connections of operating units and auxiliary apparatus in an exemplary manner as depicted in FIGS. 5a and 5b. Preceding that description, however, an explanation of a typical mode of checking an entry of a plural-digit information number will be set forth in connection with an exemplary mathematical prescription for which the exemplary apparatus connections are made to be operable.

A mathematical prescription or rule to which an information number must conform is necessarily restrictive. Prescriptions or rules for such numbers may be formulated or selected almost without limit, but the better prescriptions are those which permit easy detection of a large majority of possible number-entry errors and preferably detect all of the most commonly committed errors. The prescription selected for the exemplary illustration of the invention is formulated to detect all single-digit entry errors, about 98.7 percent of simple (adjacent-keys) transposition errors, and of the order of in excess of 90 percent of some other classes of number-entry errors. The specific exemplary prescription or rule (to which all the assigned information numbers strictly conform) may be stated:

$$\sum_{i=1}^{i=n}(a_i+b_i) \equiv 0 \bmod. 10 \qquad (I)$$

in which $a_i+b_i$ is defined by the expression $w_i d_i = 10 a_i + b_i$ with $0 \leq b_i \leq 9$, and in which $b_i$ is an integer, $n$ is the numerical quantity of digits in the significant part of the number to be checked, $d_i$ is the digit in the $i$th significant serial position in the number, $w_i$ is a numerical weighting value assigned to the $i$th significant serial digit position and is selected from among values 0, 1, and 2, and is so assigned that no two next-adjacent digits have assigned the same weighting value, all as illustrated by tabulated values and exemplary operations hereinafter set forth. Expression I is interpreted to mean that the summation of the values of $(a_i+b_i)$, for all of the significant information number digits, is divisible by the modulus 10 with 0 remainder. In the prescription, $a_i$ represents the tens digit of the product $w_i d_i$, and $b_i$ represents the units digit of the product. As will later become apparent, the remainder may be selected to be a particular specified single numerical value other than zero, which will be fixed for the particular number system and circuit connections used. In the exemplary embodiment the remainder is chosen to be zero in the interest of conciseness of description, and $n$ is arbitrarily selected to be seven and the modulus is selected to be 10. A weight of 1, or 2, is assigned to all of the keys of a particular denominational order (column), with not more than ten key columns and not more than five columns of weight 2 and not more than five columns of weight 1, and adjacent columns are in all cases assigned different weights. As will later be made apparent, the summation is essentially a summation of the products of the key values and their respective weights, modulo 9. Also, surplus columns of keys may be, and are, weighted zero. This is equivalent to exclusion of those columns or denominational orders from operations of the number-checking apparatus.

It is evident or may be proved that any account number of a group or set of account numbers already in use may be made to conform with the rule of Expression I, if the sum of the digit values of the account number is made equal to some multiple of modulus $p$ by the addition of a single singly-weighted digit (termed a check digit) to the number. In the presently used exemplary account number, one digit will be such a check digit. The purpose served by addition of that digit is to render any of a large group of serially consecutive account numbers conformable to the exemplary rule or prescription above stated, whereby a higher percentage of a certain type of number-entry errors is detected without elimination of any of the numbers from the group. An alternative but apparently much less acceptable mode of applying the system of the invention to any group of serially consecutive account numbers is to discard all of those numbers that fail to conform to the particular mathematical rule. For reasons that will become evident as the description proceeds, the check digit is chosen to be one of the digits assigned a weight value equal to unity.

While within the concept of the invention other concatenations or combinations of operating units may be employed in checking conformity of an entered number with the selected exemplary rule, and operations performed in sequences differing from those hereinafter explained in detail, the preferred embodiment of apparatus is that illustrated and performs the conformity check with respect to the previously stated prescription in a series of asynchronous steps initiated by operation of a suitable operation-initiating means such as a motor bar or key switch. The steps include, principally, the following: (1) entry of single bits or digits in the initial stages of both sections of a bi-quinary "two-digit" recirculating accumulator register; (2) actuation of a weight-controlling register operating unit; (3) operations of keyboard-scanning register means which effects successive interrogations of those keyboard key columns to which are assigned weight value 2, each interrogation being followed by transfer of a control ability to one or another of a series of units arranged as an accumulator-controlling register and acting to control shifts of the two digits in the bi-quinary accumulator; the control ability being transferred to a particular one of the register units corresponding to the numerical value of the depressed key in the column under interrogation; (4) advancing the single digit in the first section of the bi-quinary recirculating accumulator register a number of stages equal to the numerical value of the depressed key while contemporaneously shifting the digit in the other section one stage for each shift of the digit in the first section, extra digit-shifts being effected in both sections as required to render the summation of the products according to modulo 9; (5) determining the completion of the scanning operations of steps (3); (6) repeating keyboard-scanning operations but this time scanning those key columns assigned the weight-value unity, with concurrent operations of the accumulator control register and the accumulator; (7) repeating the keyboard-scanning operations of steps (3), whereby the depressed keys in the key columns assigned weight 2 do for the second time have their respective values placed or entered in the accumulator; (8) determining completion of the entry into the accumulator of all the "products" of the depressed key values multiplied by their respective weight values; (9) checking for existence of the two digits in their respective initial positions in the bi-quinary accumulator register, indicative of keyboard entry of a number conforming to the rule or prescription.

It will be understood that a recirculating bi-quinary accumulator register is employed in the interest of economy of operating units, since only five plus two units (seven) are required for accumulation modulo 10. A ten-unit straight recirculating register would operate equally well but would require additional operating units, as later herein explained.

It is evident from a consideration of accompanying Table I, which shows numerical values to be accumulated for each of key values zero through 9 when weighted unity, and when weighted with value 2,

TABLE I

| Key Value | Accumulation, Weight Value 1 | Accumulation, Weight Value 2 | Accumulation, Least Significant Digit, Weight Value 2 |
| --- | --- | --- | --- |
| 0 | 0 | 0 | 0 |
| 1 | 1 | 2 | 2 |
| 2 | 2 | 4 | 4 |
| 3 | 3 | 6 | 6 |
| 4 | 4 | 8 | 8 |
| 5 | 5 | 10 | 0 |
| 6 | 6 | 12 | 2 |
| 7 | 7 | 14 | 4 |
| 8 | 8 | 16 | 6 |
| 9 | 9 | 18 | 8 | that, if the accumulation is to be periodically divided by modulus 10 as prescribed by the rule, it is meaningless in accumulating the doubly weighted values to add into the accumulation any but the lowest significant order digits of those products greater than 9. For example, in accumulating the product of key value 6 multiplied by weight value 2 (product=12) and division by modulus 10, the only significant addition is the digit 2. Similarly, in the case of a doubly weighted key value 7, the product 14 could as well be represented in the accumulator by only the least significant digit, 4. And since only the least significant digit of the product produced when a key value is doubly weighted is of consequence, it may be noted that there is a possibility of the machine confusing, and hence not detecting (for example) depression of a doubly weighted key 7 for depression of a doubly weighted key 2. Hence the apparatus of the invention is so arranged that weighting is according to Table II, wherein it will be noted that the products of the key values and their respective weights will be added according to modulo 9.

TABLE II

| Key Value | Accumulation Weight Value 1 | Accumulation Weight Value 2 |
| --- | --- | --- |
| 0 | 0 | 0 |
| 1 | 1 | 2 |
| 2 | 2 | 4 |
| 3 | 3 | 6 |
| 4 | 4 | 8 |
| 5 | 5 | 1+0=1 (10—9) |
| 6 | 6 | 1+2=3 (12—9) |
| 7 | 7 | 1+4=5 (14—9) |
| 8 | 8 | 1+6=7 (16—9) |
| 9 | 9 | 1+8=9 (18—9) |

In Table II, it will be noted that by this expedient each value presented to the accumulator as a result of depression of a doubly-weighted key is a unique value insofar as doubly-weighted keys are concerned. That is, the value presented to the accumulator is different for each of the ten keys of a key column, being, respectively, 0, 2, 4, 6, 8, 1, 3, 5, 7, and 9. As indicated, the accumulator accumulations for each doubly-weighted key of value 5 and greater is thus one in excess of the required accumulation for simple products of key value times weight; and to correct the discrepancy, the check digit (which is by design always singly-weighted) is calculated to correct the excess. An example of how this operation is performed will be explained in connection with a detailed description of step-by-step operations of the apparatus when a typical account or identification number is entered on a machine keyboard.

FIGS. 5a and 5b, placed side by side, show the previously mentioned A register to be composed of two of the aforedescribed operating units, designated A1 and A2, respectively. The Q register comprises units Q1, Q2, Q3, and Q4. The B register has eleven units, B1 . . . B11; the E register eight units, E0 . . . E7; the F register seven units, F1 . . . F7; and the J register three units, J1, J2, and J3. The keyboard switches 100, . . . 199, are represented by respective intersections of one or another of column leads CL1, CL2, etc. with one or another of row leads RL1, RL2, etc. It is known that of the switches in any particular column, only one at a time may be closed. This is assured by conventional interlock means which may also maintain a depressed key switch closed until released manually or by machine operation. Every switch in a given column has a first one of its poles connected to the column lead for that key column, and every switch in a given row has the second of its poles connected to the row lead for that row, so that closure of a particular switch by depression of its key will electrically connect the corresponding column lead to the respective row lead. These electrical switches and leads may be of known type and construction. In the diagram, one or more diagonal lines at a lead intersection will indicate closure of the corresponding switch. For examples, note the diagonal bar (/) at switch 110 and the double diagonal, X, at switch 131.

The four N registers, N1, N2, N3, and N4, each comprising but a single respective operating unit, serve as asynchronous "clocks" or controllers for respective ones of registers B, E, F, and A. The A register serves to control application of a particular numerical weight value to a specific key column by controlling a part of the B register. The B register serves to scan the keyboard under the control of its clock, N1, and the A register. The E register serves to demark or register the numerical value of a depressed key and to control the shifting of the single digit in the accumulator register (F) to cause addition of the respective value to the accumulator. This operation is controlled by units of the B register through the plugboard PB and the keyboard KB. The E register has other functions hereinafter made evident. The accumulator (F) serves to store numerical values as they are supplied to it by units of one, and dividing the accumulation by modulus 10 each time ten ones have been accumulated, and discarding all but the least significant digit. As previously indicated, for reasons of economy of operating units, the F register or accumulator operates on a bi-quinary counting mode, units F1 through F5 serving as a first section to contain the least significant bi-quinary count and F6 and F7 serving as a second section containing the most significant bi-quinary count. In accord with the operating scheme of the exemplary embodiment of apparatus, those depressed key digits that are to be weighted by the value 1 are scanned but once and their values entered into the accumulator but once, and those which are to be weighted by the value 2 are scanned twice and their values entered into the accumulator twice. Each time a depressed key is scanned, it is effectively weighted by a value of 1; that is, each accumulator digit is advanced a number of register units equal to the numerical value of the depressed key. Hence only those depressed keys which are to be weighted by a value of two are scanned a second time. The Q register governs the first and second scannings, with respect to addition of any extra "ones" to the accumulator. The J register units serve to distinguish between doubly-weighted key values equal to or in excess of five, and those less than five, with the J3 unit serving as a post-carry controller which transfers control back to N1 after an extra "one" is entered into the accumulator following the initial or first accumulation of each doubly-weighted key value equal to or in excess of five. The Q and J registers may thus be considered as modifying registers since they provide for the addition of extra "ones" when the predetermined digits 5 to 9 occur in columns which are to be doubly weighted. As pointed out previously in connection with Tables I and II, such a modification is provided in order to prevent confusion between the single weighted digits 0 to 4 and the doubly weighted digits 5 to 9.

Unit A2 is caused to interrogate the least significant section of the bi-quinary accumulator after the summation has been completed, and to concurrently prepare the G2 unit for initiating machine-control operations which are left contingent upon the result of interrogation of the other or "fives" section of the accumulator (F6, F7). Preparation for the latter interrogation is made by the A2 unit concurrently with preparation of the G2 unit, by concurrent change of G1 to the active state at the same time unit G2 is driven to "1" by the TA2 pulse. Following concurrent preparation of G2 and interrogation of F1, the test for conformity is only continued if the digit in the F1–F5 section has been found in residence at its original location. In this embodiment, the digit must reside at F1 when the test is initiated, if conformity exists, and so the TA2 pulse courses through unit F1. If the digit resides at F1, the TA2 pulse returns F1 to "0" and thereby initiates the concluding portions of the test; otherwise, no further operations ensue and the alarm or signal originally activated remains effective. These details of the exemplary operations will be made fully clear and evident in connection with the following description of the sequential operations of the apparatus.

*Sequence of step operations*

To illustrate in detail the operation of the exemplary apparatus in checking the congruence or conformity of a number entered on a keyboard, with the prescription stated in Expression I, the operational steps followed by the apparatus in checking a keyboard entry of the plural-digit account number 1334366000 will be described in some details; and the differences in operation when a number is correctly entered on the keys and when an erroneous entry has been made will be illustrated by assuming that the above stated number has been incorrectly entered as 1324366000. Further, in the explanation, a rather simple plugboard interconnection arrangement will be used as illustrative; it being understood that wide variations therein may be made within the concept of the invention. In the arrangement used, alternate (odd numbered) key columns will be assigned weight value 1, that is, will be singly weighted, and the intervening (even numbered) key columns will be assigned weight 2, that is, will be doubly weighted. This arrangement of plugboard connections is shown on FIG. 5a. Depressed keys in columns assigned weight 1 will be denoted by a single diagonal bar (/), while depressed keys in columns assigned weight 2 will be denoted by double diagonal bars (X), at the respective key positions on keyboard KB (FIG. 5a).

Subsequent to depression of the keys in entering a number of the keyboard, and incident to operation of the motor bar or key MB (FIG. 1), actual operation of the apparatus in testing conformity of the entered number is commenced. The operation is initiated by momentary closure of the contacts of a switch, indicated as MBS1 (lower left in FIG. 5a) incident to motor bar operation. Thereby a pulse of current of relatively long duration is supplied by any suitable or conventional power means PM, the current coursing through a circuit herein termed a setting circuit, designated S, which circuit includes setting windings on the cores of all of the units except Q2, Q4, N2, N3, N4, and E2. The effect of this setting pulse and operation is to coerce all the cores of the units, excepting those just mentioned, to a particular one of the "0" and "1" states, as indicated by the respective arrow points along the setting circuit lead. Thus A1 is set or coerced to "1," A2 to "0," Q1 to "1," etc. A steady bias current is during the operating period of the machine supplied by conventional power supply means indicated at BP (upper right, FIG. 5b), and passes through a bias circuit BC which includes biasing windings on each of units N4, N1, N2, N3, E2, Q4, and Q2. The bias effect is such as to normally maintain each of those units in "0" state, but also is such as to be temporarily overcome by normal operating pulses of opposing coercivity effect which pass through other windings in one or more of those units. For example, unit N1 is normally maintained in "0" by the bias, but a downwardly directed pulse through any of the other N1 windings would, by design, temporarily overcome the bias and drive the core of N1 to "1." Upon substantial decay of the pulse the core would be reversely coerced or "flipped" back to "0" by the bias. Exactly that action occurs as the first in the sequence of units operations commencing upon decay of the aforementioned setting pulse through unit N1. The operation of any operating unit of the apparatus may be represented symbolically, and a system of symbolic representation of units operations is hereinafter used in the interest of conciseness in explanations. The representation is according to the following rules: (a) The output pulse of a conducting transistor T of an operating unit is designated by the letter T followed by the unit designation. Thus TB3 represents the output or collector circuit pulse provided by the transistor of unit B3 when the transistor momentarily conducts as the core of that unit is driven from "1" state to "0" state. (b) The driving of the core of an operating unit to a particular remanent state, "0" or "1," is represented by the designation of that unit, followed by a dash (—) and the symbolic representation of the state to which the core is driven. Thus E3–0 means the core of E3 is driven to 0 state. (c) The result produced by a transistor output pulse is preceded by a colon (:). Thus the expression TB3:B4–1 means the output pulse of the transistor of unit B3 drives the core of unit B4 to "1." If the result is plural in nature, the other results follow, in order, separated by commas. For example, TB3:B4–1, E4–1, E1–1, J1–1 is interpreted as: the output pulse of the transistor of unit B3 drives the core of unit B4 to "1," the core of E4 to "1," and those of E1 and J1 to "1." (d) When a core is normally biased to "0" and is temporarily driven to "1" and then returned to "0" by the bias current, the action is represented by –1–0 preceded by the designation of the unit concerned; for example, TQ1:Q2–1–0 represents that the output pulse of the transistor of unit Q1 drives the core of unit Q2 to "1" against a normal bias, and thereafter the bias automatically returns the core to "0." (e) In all instances, the transistor of a unit passes an output pulse only when the core of that unit is driven from "1" state to "0" state. (f) In some instances separate actions may be concurrent, and are considered to occur in the same step. This happens in contemporaneous digit-shifting actions in the two sections of the accumulator.

The steps followed by the apparatus units follow one after another by automatic asynchronous actions of the units, and are initiated by decay of the setting pulse supplied through the setting lead or circuit, S. For the checking of the previous stated number entry 1324366000, and plugboard weighting connections as indicated on FIGS. 5a and 5b, and with the units interconnected as there shown, the operations of the embodiment of FIGS. 5a and 5b in carrying out the prescription stated in Expression I can be demonstrated by a symbolic tabulation using the above symbology. This symbolic tabulation will be presented shortly. First, however, a brief simplified mathematical explanation of the operations performed will be given to serve as a guide for the symbolic tabulation to follow.

Expression I set out previously may most simply be understood from the following step-by-step word description:

(1) Take each digit $d_i$ in each of the $n$ columns of the number to be checked and multiply it by its column weighting value $w_i$. For example, if the digit in a column is 8 and its column weighting value is 1, then the product for that column is $1 \times 8 = 8$. As another example, if the digit in a column is 6 and its column weighting value is 2, then the product for that column is $2 \times 6 = 12$. The symbol $b_i$ in Expression I represents the least significant integer of each such product, such as 8 for the product 8 and 2 for the product 12, while the symbol $a_i$ represents the tens integer, such as 0 for the product 8 and 1 for the product 12.

(2) The $a_i$ and $b_i$ integers obtained from the products of the various columns, as indicated above, are now summed separately. Or, stated another way, all single products (where $a_i = 0$) are summed normally, while double integer products (such as 12 where $a_i = 1$ and $b_i = 2$) are summed as $a_i + b_i$ for each such double integer column. Thus, the product 12 would be summed as $1 + 2 = 3$ and not as 12. As an example, the products 8, 7, 16, 2, and 10 would be summed in accordance with Expression I as $8 + 7 + (1+6) + 2 + (1+0)$, it being noted that the products 16 and 10 are summed as $1 + 6$ and $1 + 0$, respectively.

(3) Next, divide the total sum obtained in step (2) by 10 (or by whatever other modulus might be used) and note the remainder. Since Expression I requires a remainder of 0, the obtaining of a zero remainder after division by the modulus 10 indicates a correctly entered number, and any other remainder indicates an error.

As brought out previously, the particular embodiment of the invention illustrated in FIGS. 5a and 5b has been designed in accordance with Expression I for a remainder of zero and for column weighting values which alternate 1, 2, 1, 2, . . . Thus, for this specific design, if a typical account number 1334366000 is correctly entered, it will produce a result as follows (note that zero columns are omitted since they do not affect the result):

| | | | | | | | |
|---|---|---|---|---|---|---|---|
| Digit $d_i$ | 1 | 3 | 3 | 4 | 3 | 6 | 6 |
| Weight $w_i$ | 1 | 2 | 1 | 2 | 1 | 2 | 1 |
| Product $w_i d_i$ | 1 | 6 | 3 | 8 | 3 | 12 | 6 |
| $\Sigma a_i + b_i$ | \multicolumn{7}{l}{$1+6+3+8+3+1+2+6=30$} |
| Division by 10 | \multicolumn{7}{l}{$30/10 = 3$} |
| Remainder | \multicolumn{7}{l}{0} |

If the above account number were incorrectly entered as 1324366000, the result is then (zero columns again being omitted):

| | | | | | | | |
|---|---|---|---|---|---|---|---|
| Digit $d_i$ | 1 | 3 | 2 | 4 | 3 | 6 | 6 |
| Weight $w_i$ | 1 | 2 | 1 | 2 | 1 | 2 | 1 |
| Product $d_i w_i$ | 1 | 6 | 2 | 8 | 3 | 12 | 6 |
| $\Sigma a_i + b_i$ | \multicolumn{7}{l}{$1+6+2+8+3+1+2+6=29$} |
| Division by 10 | \multicolumn{7}{l}{$29/10 = 2\,9/10$} |
| Remainder | \multicolumn{7}{l}{9} |

From the foregoing, it should be evident that a correctly entered account number gives the desired remainder of 0, while an incorrectly entered account number gives a remainder other than 0, thereby indicating an error in entry. It should also be evident how Expression I, by its $a_i + b_i$ summation of double integer products effectively provides for the addition of extra "ones" when the predetermined digits 5 to 9 occur in doubly weighted columns so as to prevent confusion, as previously considered in connection with Table I and Table II.

With the above generalized mathematical explanation as a background, the following symbolic tabulation which specifically describes the operation of the embodiment of FIGS. 5a and 5b should now be readily understood.

| Step No. | Units operations |
|---|---|
| BIAS | N1, N2, N3, N4, E2, Q2, Q4, all to "0." |
| SET | A1, Q1, B6, F1, F7, all to "1"; A2, Q3, J1, J2, J3, G1, G2, B1 through B5, B7 through B11, E0 through E7, and F2 through F6, all to "0"; and N1–1–0. As the setting pulse decays, the bias returns clock N1 to 0 and the transistor TN1 conducts a pulse. |
| 1 | TN1:B6–0 (Clock N1 passes a pulse through lead LN1 and thus interrogates the B register, finds only B6 active, and drives B6 to "0," causing TB6 to conduct or "fire.") |
| 2 | TB6:B7–1, E6–1, E0–1, J2–1, N2–1–0 (The TB6 pulse courses along lead LB6, "down" through B7, driving that unit to "1," courses on through plugboard patch cord PB6, column lead terminal KC2, column lead CL2, closed key switch 131, out row lead RL4, "down" through unit E6, along E common lead ECOM1, "down" through E0, "down" through unit J2, along lead JRL, and down through unit N2 to a negative pole of a power source. N2 is only temporarily driven to 1, and quickly returns to "0" because of the bias, firing TN2.) |
| 3 | TN2:E6–0 (Each time clock N2 fires it interrogates the E register, through lead LN2. E6 having been set to "1" by TB6 during step 2, is returned to "0" and TE6 pulses.) |
| 4 | TE6:E5–1, N3–1–0 (The TE6 pulse passes "down" through unit E5 (transferring the ability to perform a control function from E6 to E5), along E common lead ECOM2, and triggers accumulator clock N3 to cause the latter to initiate movement of the digit in unit F1 of the "ones" section of the accumulator one unit to the right and the digit in F7 to F6. This accumulator action is performed in steps 5 and 6.) |
| 5 | TN3:F1–0, F7–0 (Note that each time the digit in the "ones" section of the biquinary accumulator register is shifted one unit, the digit in the "fives" section is shifted from F7 to F6 or vice versa. The reason for this, if not already evident, will become so prior to termination of the explanations.) |
| 6  1 | TF1:F2–1, N2–1–0; TF7:F6–1, N2–1–0 (Note there are separate concurrent operations, each involving a respective section of the accumulator register, but both terminating in contemporaneous triggering of the E register clock, N2. Note that the digits are now in F2 and F6, and that a single "one" of the value (3) of key 131 has been entered into the accumulator. This "one" is symbolically represented by the underscored 1 following the step number.) |
| 7 | TN2:E5–0 (Similar to step 3. Note how each step includes an action which initiates the next step of operations.) |
| 8 | TE5:E4–1, N3–1–0 (Similar to step 4.) |
| 9 | TN3:F2–0, F6–0 (Similar to step 5.) |
| 10  2 | TF2:F3–1, N2–1–0; TF6:F7–1, N2–1–0 (The second "one" of the three ones represented by key 131 has |

| | | |
|---|---|---|
| | | been added to the previous accumulation in the F register, as indicated by the underscored 2.) |
| 11 | | TN2:E4-0 |
| 12 | | TE4:E3-1, N3-1-0 |
| 13 | | TN3:F3-0, F7-0 |
| 14 | 3 | TF3:F4-1, N2-1-0; TF7:F6-1, N2-1-0 (Note that by a series of similar cooperative actions of the E and F registers and their respective clocks, the "three" value of key 131 which was registered in E6 at step 2 has now been entered into the accumulator and the apparatus is about to initiate operations leading to interrogation of the B register for determining and registering next doubly-weighted key value.) |
| 15 | | TN2:E3-0 (Whenever E3 is driven to "0," control of operations is to be shifted from the E register.) |
| 16 | | TE3:E2-1-0 |
| 17 | | TE2:E0-0 (Note that only E0 of E1 and E0 was driven to "1" at step 2; this being because the key value of key 131 was less than 5.) |
| 18 | | TE0:Q1-0 (Via lead LE0.) |
| 19 | | TQ1:Q2-1-0 (Via lead LQ1.) |
| 20 | | TQ2:Q1-1, J2-0 (J2 having been set to "1" in step 2.) |
| 21 | | TJ2:N1-1-0 (The B register clock, N1, has been triggered for the second interrogation of the B register.) |
| 22 | | TN1:B7-0 (Refer to, or "see," step 2 in which B7 was driven to "1.") |
| 23 | | TB7:B8-1, E7-1, E0-1, J2-1, N2-1-0 (Similar to step 2. At this step the B register interrogation of the keyboard is advanced two key columns, to the fourth column.) |
| 24 | | TN2:E7-0 |
| 25 | | TE7:E6-1, N3-1-0 |
| 26 | | TN3:F4-0, F6-0 (See results of step 14.) |
| 27 | 1 | TF4:F5-1, N2-1-0; TF6:F7-1 (Similar to step 14; this step entering into the accumulator the first "one" of the key-value, 4, of the depressed key 143.) |
| 28 | | TN2:E6-0 |
| 29 | | TE6:E5-1, N3-1-0 |
| 30 | | TN3:F5-0; F7-0 |
| 31 | 2 | TF5:F1-1, N2-1-0; TF7:F6-1 (The second "one" of key-value 4 of key 143 has been entered. Note that the digit in the ones section of the F register is recirculated, or re-entered into F1 since there has been a total of five ones accumulated. This, in effect, amounts to division of the accumulation by five, and is distinguished from an effective division by ten by the presence of a digit in F6. Two divisions by five, equivalent to one division by ten, results in the "fives" digit reposing in F7, as will presently be noted.) |
| 32 | | TN2:E5-0 |
| 33 | | TE5:E4-1, N3-1-0 |
| 34 | | TN3:F1-0, F6-0 |
| 35 | 3 | TF1:F2-1, N2-1-0; TF6:F7-1 |
| 36 | | TN2:E4-0 |
| 37 | | TE4:E3-1, N3-1-0 |
| 38 | | TN3:F2-0, F7-0 |
| 39 | 4 | TF2:F3-1, N2-1-0; TF7:F6-1 (Note that the last "one" of the value of key 143 has been entered.) |
| 40 through 46 | | (Same operations as in steps 15 through 21.) |
| 47 | | TN1:B8-0 (B register interrogated for the third doubly-weighted key.) |
| 48 | | TB8:B9-1, E4-1, E1-1, J1-1, N2-1-0 (Note that since the depressed key, 165, has a value greater than 4, E1 rather than E0 is activated, and similarly J1 rather than J2. This is to cause the E register to step through part of one cycle to cause entry of that part of the value in excess of five, plus one full cycle to cause entry of a value of five; and also, since key 165 is a doubly-weighted key, to cause N3 to enter the extra "one" previously mentioned and allow J3 to pass control to N1 after this extra addition.) |
| 49 | | TN2:E4-0 |
| 50 | | TE4:E3-1, N3-1-0 |
| 51 | | TN3:F3-0, F6-0 (See step 39.) |
| 52 | 1 | TF3:F4-1, N2-1-0; TF6:F7-1 (The first "one" of six represented by depressed key 165 is entered into the accumulator.) |
| 53 | | TN2:E3-0 |
| 54 | | TE3:E2-1-0 |
| 55 | | TE2:E1-0 (See step 48.) |
| 56 | | TE1:E0-1, E7-1, N3-1-0 (Note that E1 has set the E register at E7 to register the remaining five of the six "ones" required by key 165, and at the same time has reset the control to reside in E0.) |
| 57 | | TN3:F4-0, F7-0 |
| 58 | 2 | TF4:F5-1, N2-1-0; TF7:F6-1 |
| 59 | | TN2:E7-0 |
| 60 | | TE7:E6-1, N3-1-0 |
| 61 | | TN3:F5-0, F6-0 |
| 62 | 3 | TF5:F1-1, N2-1-0; TF6:F7-1 (Note that ten "ones" have been entered into the accumulator, and the accumulation operated upon modulo 10, leaving the digits in the accumulator sections in their original locations.) |
| 63 | | TN2:E6-0 |
| 64 | | TE6:E5-1, N3-1-0 |
| 65 | | TN3:F1-0, F7-0 |
| 66 | 4 | TF1:F2-1, N2-1-0; TF7:F6-1 |
| 67 | | TN2:E5-0 |
| 68 | | TE5:E4-1, N3-1-0 |
| 69 | | TN3:F2-0, F6-0 |
| 70 | 5 | TF2:F3-1, N2-1-0; TF6:F7-1 |
| 71 | | TN2:E4-0 |
| 72 | | TE4:E3-1, N3-1-0 |
| 73 | | TN3:F3-0, F7-0 |
| 74 | 6 | TF3:F4-1, N2-1-0; TF7:F6-1 (Note that now all six "ones" for key 165 have been entered; and since a doubly-weighted key-value in excess of four has been entered, the apparatus will proceed to enter into the accumulator the above-noted extra "one" to cause the accumulation to be the sum of terms congruent to modulo 9.) |
| 75 through 79 | | (Same as steps 15 through 19.) |
| 80 | | TQ2:Q1-1, J1-0 (See step 48.) |
| 81 | | TJ1:J3-1, N3-1-0 |
| 82 | | TN3:F4-0, F6-0 (See step 74.) |
| 83 | 1 | TF4:F5-1, N2-1-0; TF6:F7-1 (The |

| Step | | Description |
|---|---|---|
| 84 | | TN2:J3-0 (See step 81, and note that all of E7 . . . E3 are at "0.") |
| 85 | | TJ3:N1-1-0 (TJ3 returns control to scanner clock N1.) |
| 86 | | TN1:B9-0 |
| 87 | | TB9:B10-1, E3-1, E0-1, J2-1, N2-1-0 (Note that the B9 pulse finds only a zero key depressed in the eighth column of keys, and hence is routed through E3, which will simply by-pass the accumulator and initiate a new interrogation of the B register.) |
| 88 through 94 | | (Same as steps 15 through 21.) |
| 95 | | TN1:B10-0 (See step 87.) |
| 96 | | TB10:B11-1, E3-1, E0-1, J2-1, N2-1-0 (Similar to step 87.) |
| 97 through 103 | | (Same as steps 15 through 21.) |
| 104 | | TN1:B11-0 |
| 105 | | TB11:Q1-0, Q3-1, N4-1-0 (Note that the B register has concluded the first scanning of the doubly-weighted key rows of the keyboard, and changes the Q register for operation on singly-weighted key rows. In changing the Q register, note that the B11 transistor pulse aids the normal bias on Q2 to hold Q2 against the reversing effect of the TQ1 pulse. The TQ1 pulse would otherwise temporarily reverse Q2 and thereby initiate reversal of Q1 to 1 whereby subsequent E0 pulses would cause creation of Q1 and Q2 pulses and enter extra ones in the accumulator, and, also initiate reversal of J2 to 0 and thus prematurely activate clock N1.) |
| 106 | | TN4:A1-0 (See the SET, preceding step 1.) |
| 107 | | TA1:A2-1, B1-1, N1-1-0 (By this step the A2 unit has been endowed with a necessary control function ability, viz: the power to interrogate F1 at the conclusion of the product accumulation steps, to determine presence or absence of a digit in the F1 unit. Also, the B register is prepared for the second scanning for tallying the values of the depressed keys of the singly-weighted columns and the second addition of the values of the depressed keys of the doubly-weighted columns. This preparation is effected by the TA1 pulse as it drives B1 to "1.") |
| 108 | | TN1:B1-0 |
| 109 | | TB1:B2-1, E4-1, E0-1, J2-1, N2-1-0 (J2 was returned to "0" at step 102.) |
| 110 | | TN2:E4-0 |
| 111 | | TE4:E3-1, N3-1-0 |
| 112 | | TN3:F5-0, F7-0 (See step 83.) |
| 113 | 1 | TF5:F1-1; N2-1-0; TF7:F6-1 (The "one" of singly-weighted key 110 has been accumulated.) |
| 114 | | TN2:E3-0 |
| 115 | | TE3:E2-1-0 |
| 116 | | TE2:E0-0 |
| 117 | | TE0:Q3-0 (See step 105.) |
| 118 | | TQ3:Q4-1-0 |
| 119 | | TQ4:Q3-1, N1-1-0 |
| 120 | | TN1:B2-0 (See step 109.) |
| 121 | | TB2:B3-1, E5-1, E0-1, J2-1, N2-1-0 (By way of incorrectly depressed key 122.) |
| 122 | | TN2:E5-0 |
| 123 | | TE5:E4-1, N3-1-0 |
| 124 | | TN3:F1-0, F6-0 |
| 125 | 1 | TF1:F2-1, N2-1-0; TF6:F7-1 |
| 126 | | TN2:E4-0 |
| 127 | | TE4:E3-1, N3-1-0 |
| 128 | | TN3:F2-0, F7-0 |
| 129 | 2 | TF2:F3-1, N2-1-0; TF7:F6-1 |
| 130 through 135 | | (Same as 114 through 119. The "two" of key 122 has been entered in the accumulator.) |
| 136 | | TN1:B3-0 |
| 137 | | TB3:B4-1, E6-1, E0-1, J2-1, N2-1-0 (J2 actually was set to 1 in step 121 and does not have to be set to "1" at all since there will be no more Q2 pulses.) |
| 138 | | TN2:E6-0 |
| 139 | | TE6:E5-1, N3-1-0 |
| 140 | | TN3:F3-0, F6-0 |
| 141 | 1 | TF3:F4-1, N2-1-0; TF6:F7-1 (The first "one" of three represented by key 134 has been accumulated.) |
| 142 | | TN2:E5-0 |
| 143 | | TE5:E4-1, N3-1-0 |
| 144 | | TN3:F4-0, F7-0 |
| 145 | 2 | TF4:F5-1, N2-1-0; TF7:F6-1 |
| 146 | | TN2:E4-0 |
| 147 | | TE4:E3-1, N3-1-0 |
| 148 | | TN3:F5-0, F6-0 |
| 149 | 3 | TF5:F1-1, N2-1-0; TF6:F7-1 (The third "one" of key 134 has been added, and the second accumulation of ten ones divided by modulus 10, again bringing the accumulator back to its initial condition with the digits in F1 and F7.) |
| 150 through 155 | | (Same as steps 114 through 119.) |
| 156 | | TN1:B4-0 |
| 157 | | TB4:B5-1, E1-1, E4-1, J1-1, N2-1-0 (Similar to step 48.) |
| 158 | | TN2:E4-0 |
| 159 | | TE4:E3-1, N3-1-0 |
| 160 | | TN3:F1-0, F7-0 |
| 161 | 1 | TF1:F2-1, N2-1-0; TF7:F6-1 |
| 162 | | TN2:E3-0 |
| 163 | | TE3:E2-1-0 |
| 164 | | TE2:E1-0 (See step 157.) |
| 165 | | TE1:E0-1, E7-1, N3-1-0 |
| 166 | | TN3:F2-0, F6-0 |
| 167 | 2 | TF2:F3-1, N2-1-0; TF6:F7-1 |
| 168 | | TN2:E7-0 |
| 169 | | TE7:E6-1, N3-1-0 |
| 170 | | TN3:F3-0, F7-0 |
| 171 | 3 | TF3:F4-1, N2-1-0; TF7:F6-1 |
| 172 | | TN2:E6-0 |
| 173 | | TE6:E5-1, N3-1-0 |
| 174 | | TN3:F4-0, F6-0 |
| 175 | 4 | TF4:F5-1, N2-1-0; TF6:F7-1 |
| 176 | | TN2:E5-0 |
| 177 | | TE5:E4-1, N3-1-0 |
| 178 | | TN3:F5-0, F7-0 |
| 179 | 5 | TF5:F1-1, N2-1-0; TF7:F6-1 |
| 180 | | TN2:E4-0 |
| 181 | | TE4:E3-1, N3-1-0 |
| 182 | | TN3:F1-0, F6-0 |
| 183 | 6 | TF1:F2-1, N2-1-0; TF6:F7-1 (All six "ones" for singly-weighted key 166 have been accumulated and, since key 108 is a zero, this step actually completes entry into the | extra "one" has been entered into the accumulator.)

|   |   |   |
|---|---|---|
|   |   | accumulator of all the numerical values of the singly-weighted keys. Note that an extra "one" will be entered in this case, key 166 being only singly-weighted.) |
| 184 through 189 | | (Same as steps 114 through 119.) |
| 190 | | TN1:B5-0 (See step 157.) |
| 191 | | TB5:B6-1, E3-1, E0-1, J2-1, N2-1-0 |
| 192 | | TN2:E3-0 (Since key 108 is a zero, the accumulator is not activated. This completes the scan and entry of singly-weighted key values.) |
| 193 through 197 | | (Same as steps 115 through 119). |
| 198 | | TN1:B6-0 (The second scan of doubly-weighted key columns is commenced.) |
| 199 | | TB6:B7-1, E6-1, E0-1, J2-1, N2-1-0 |
| 200 | | TN2:E6-0 |
| 201 | | TE6:E5-1, N3-1-0 |
| 202 | | TN3:F2-0, F7-0 (See step 183.) |
| 203 | 1 | TF2:F3-1, N2-1-0; TF7:F6-1 |
| 204 | | TN2:E5-0 |
| 205 | | TE5:E4-1, N3-1-0 |
| 206 | | TN3:F3-0, F6-0 |
| 207 | 2 | TF3:F4-1, N2-1-0; TF6:F7-1 |
| 208 | | TN2:E4-0 |
| 209 | | TE4:E3-1, N3-1-0 |
| 210 | | TN3:F4-0, F7-0 |
| 211 | 3 | TF4:F5-1, N2-1-0; TF7:F6-1 (The three "ones" of key 131 have now been twice added to the accumulation in the F register.) |
| 212 through 217 | | (Same as steps 114 through 119.) |
| 218 | | TN1:B7-0 |
| 219 | | TB7:B8-1, E7-1, E0-1, J2-1, N2-1-0 |
| 220 | | TN2:E7-0 |
| 221 | | TE7:E6-1, N3-1-0 |
| 222 | | TN3:F5-0, F6-0 |
| 223 | 1 | TF5:F1-1, N2-1-0; TF6:F7-1 |
| 224 | | TN2:E6-0 |
| 225 | | TE6:E5-1, N3-1-0 |
| 226 | | TN3:F1-9, F7-0 |
| 227 | 2 | TF1:F2-1, N2-1-0; TF7:F6-1 |
| 228 | | TN2:E5-0 |
| 229 | | TE5:E4-1, N3-1-0 |
| 230 | | TN3:F2-1, F6-0 |
| 231 | 3 | TF2:F3-1, N2-1-0; TF6:F7-1 |
| 232 | | TN2:E4-0 |
| 233 | | TE4:E3-1, N3-1-0 |
| 234 | | TN3:F3-0, F7-0 |
| 235 | 4 | TF3:F4-1, N2-1-0; TF7:F6-1 (Concluding the second series of accumulations for key 143.) |
| 236 through 241 | | (Same as steps 114 through 119.) |
| 242 | | TN1:B8-0 (See step 219.) |
| 243 | | TB8:B9-1, E1-1, E4-1, J1-1, N2-1-0 |
| 244 | | TN2:E4-0 |
| 245 | | TE4:E3-1, N3-1-0 |
| 246 | | TN3:F4-0, F6-0 |
| 247 | 1 | TF4:F5-1, N2-1-0; TF6:F7-1 |
| 248 | | TN2:E3-0 |
| 249 | | TE3:E2-1-0 |
| 250 | | TE2:E1-0 |
| 251 | | TE1:E0-1, E7-1, N3-1-0 |
| 252 | | TN3:F5-0, F7-0 |
| 253 | 2 | TF5:F1-1, N2-1-0; TF7:F6-1 |
| 254 | | TN2:E7-0 |
| 255 | | TE7:E6-1, N3-1-0 |
| 256 | | TN3:F1-0, F6-0 |
| 257 | 3 | TF1:F2-1, N2-1-0; TF6:F7-1 |
| 258 | | TN2:E6-0 |
| 259 | | TE6:E5-1, N3-1-0 |
| 260 | | TN3:F2-0, F7-0 |
| 261 | 4 | TF2:F3-1, N2-1-0; TF7:F6-1 |
| 262 | | TN2:E5-0 |
| 263 | | TE5:E4-1, N3-1-0 |
| 264 | | TN3:F3-0, F6-0 |
| 265 | 5 | TF3:F4-1, N2-1-0; TF6:F7-1 |
| 266 | | TN2:E4-0 |
| 267 | | TE4:E3-1, N3-1-0 |
| 268 | | TN3:F4-0, F7-0 |
| 269 | 6 | TF4:F5-1, N2-1-0; TF7:F6-1 (Note that an extra "one" is not added following the second entry of the value of key 165.) |
| 270 | | TN2:E3-0 |
| 271 | | TE3:E2-1-0 |
| 272 | | TE2:E0-0 |
| 273 | | TE0:Q3-0 |
| 274 | | TQ3:Q4-1-0 |
| 275 | | TQ4:Q3-1, N1-1-0 |
| 276 | | TN1:B9-0 (See step 243.) |
| 277 | | TB9:B10-1, E3-1, E0-1, J2-1, N2-1-0 |
| 278 through 283 | | (Same as steps 114 through 119.) |
| 284 | | TN1:B10-0 |
| 285 | | TB10:B11-1, E3-1, E0-1, J2-1, N2-1-0 |
| 286 through 291 | | (Same as steps 114 through 119). |
| 292 | | TN1:B11-0 |
| 293 | | TB11:Q3-1, N4-1-0 |
| 294 | | TN4:A2-0 |
| 295 | | TA2:G1-1, G2-1 (The TA2 pulse has found the F1 unit at "0," that is, not storing a digit, hence, F1 is not fired by the TA2 pulse, and, while G1 and G2 are by the TA2 pulse set in readiness for causing power to be supplied to energize relay RYC, no further action is permitted, and the warning signal activated during the period relay coil RYC is not energized, continues to give warning indicating entry of a number nonconformable to the prescription. |

Referring to steps 121 through 129, during which the two "ones" representing erroneously depressed key 132 were entered, and considering the final positions of the digits in the two sections of the accumulator, it is evident that if the "three" key (key 132) of the third key column had been depressed, the TB2 pulse in step 121 would have driven E6 to "1," rather than E5; and it is also evident that the series of succeeding steps would have included entry of three "ones" rather than only two, into the accumulator. The change may be symbolically tabulated as follows, commencing with step 120:

| 120 | | TN1:B2-0 |
|---|---|---|
| 121 (corrected) | | TB2:B3-1, E6-1, E0-1, J2-1, N2-1-0 |
| 122 (corrected) | | TN2:E6-0 |
| 123 (corrected) | | TE6:E5-1, N3-1-0 |
| 124 | | TN3:F1-0, F6-0 |
| 125 | 1 | TF1:F2-1, N2-1-0; TF6:F7-1 |
| 126 (corrected) | | TN2:E5-0 |

And, of course, the digits in both sections of the F register would subsequently have been advanced one operating unit or stage from the locations where they actually resided at the termination of operations in checking the incorrectly entered number. Now taking these facts into account, and referring to step 269, it is clear that the entry of the last "one" of the six ones for key 165 would have shifted the digit from F5 to F1 and the digit from F6 to F7. That would leave F1 at "1" and F7 at "1." Assuming this to have occurred (as a consequence of correct entry of the number 1334366000), the terminating steps of the checking operation, commencing with previously written step 294, would be as follows:

| 294a | | TN4:A2-0 |
|---|---|---|
| 295a | | TA2:F1-0, G1-1, G2-1 (F1 is inter- |

| | |
|---|---|
| 296 | TF1:F2–1, N2–1–0 |
| 297 | TN2:G1–0 (See step 295a.) |
| 298 | TG1:F7–0 (F7 is interrogated for presence of a digit, this action depending upon previous successful interrogation of F1 in step 295a. Since this interrogation is also successful, the apparatus completes the operations necessary to unlock the machine.) |
| 299 | TF7:G2–0 (See step 295a.) | rogated for presence of a digit, and as a result of F1 being driven to "0," operations continue.)

The transistor of unit G2 is shown outside the rectangle as TG2, in the interest of clarity. This transistor may be of the NPN type and may be connected to be triggered into conduction when the core of unit G2 is driven from "1" to "0," as indicated. As TG2 conducts due to the TF7 pulse reversing the core of G2, the potential applied to the base of a latch transistor TL changes from + to − in polarity, which permits TL to conduct. Conduction through TL applied a continuing + bias on the base of TG2, causing that transistor to continue conducting after the termination of the triggering potential produced by core turnover in G2. Current conducted by TL passes through relay coil RYC and a resistor RRYC in parallel, and through a switch MBS2 which is closed by motor bar actuation and automatically opened after the machine completes a cycle of operations, providing the check is successful. It is evident then, that the two transistor circuits operate as a latching relay circuit which is "set up" or latched into a current-conducting state incident to turnover of the core of G2 from "1" to "0"; and that the relay coil which is energized as the latch circuit sets up, may be used to control operation of the machine and indicator means and/or signals by holding open, and closed, respective sets of relay contacts interposed in machine-operating and signal circuits in any of numerous conventional or obvious modes.

In the preceding explanation of the operation of the apparatus in checking entry of a number entered on a keyboard, the last three digits were selected to have zero values, to illustrate a point of operation, namely, that the account or information number need not have as many digits as the keyboard has columns of keys. The "zero" keys of all of the columns have one terminal of each switch connected to the row #1 lead, RL1, which causes by-passing of the F register for all those keys. Further, means are provided whereby any one or more of the column leads may be switched to apply a zero weight to all the keys of that column. This is done by changing the plugboard patch cord to connect the B register output leads to the "LD0" lead at terminal D0, which lead then serves to pass the respective B register output pulses through E3 of the E register. For example, disconnection of patch PB1 (shown interconnecting terminals B1P and KC1) from KC1 and connection thereof to terminal D0, to directly connect B1P and D0, would serve to weight any key of the first column with the value zero. In this way, as many key columns as it is desired may effectively be nullified and rendered of no effect in the account number checking operation. Hence the account or information numbers may each comprise only a small number of digits. Also it is evident that any desired set of columns of keys may be used for information numbers, without in any way changing the effectiveness of the keys of other columns for other purposes, by appropriate use of the plugboard patch cords.

In the preceding example, the last singly-weighted key value, six, entered by key 166, was the check digit, the value six having been selected so that the original account number 133436 could be one of a long series of consecutive account numbers. It is evident that the next number of that series would require the check digit 4; and that a proper check digit could be selected for any other plural-digit account number for the series. Further it may be noted that the digital position of the check digit may be other than that used; for example, it may be the first digit.

In the preceding explanation of the operation of the exemplary apparatus, the congruence was specified to be to modulus 10, with zero remainder. It is evident that if it is desired that the remainder be some digital value other than zero, the "check" number included in an information number can be figured to be such as to leave that desired remainder. To detect that value as a remainder it is only necessary to start the least significant digit in the accumulator at F1, and then apply the TA2 pulse through a lead LA2 directed through the appropriate different F register unit. For instance, in the preceding example, if a remainder 2 were desired, check number 6 entered in key column 7 would be altered to 8, entered on key 186, and lead LA2 directed through F3 rather than through F1. The digit originally started at F1 would be that case terminate in unit F3, and the check would proceed to a successful conclusion.

It may be noted that with an average operating-unit turnover and firing time of the order of 2.5 microseconds, the approximately three hundred operating steps of the apparatus in performing the exemplary identification number check requires approximately three-fourths of one millisec of time. Numbers having a preponderance of higher-valued digits would require proportionately longer; however, few if any account number systems require seven digits, and hence it is seen that for practically all normally used number systems the checking operations may occur within a period of the order of one millisec following the depression of the motor bar or switch key of the machine, or following the initiation of the check in any other manner. Thus there is no actual delay in normal machine operations and no noticeable waiting period is required for the apparatus to perform the check.

From the preceding general description of the characteristics of the invention and a detailed description of an exemplary physical embodiment or apparatus and the operation thereof, it is evident that the invention provides in the exemplary apparatus, a means for accomplishing the previously stated objects, that means comprising in combination a plurality of sets or groups of bistable state operating units, certain ones of the sets forming single-digit shifting registers, a plurality of asynchronous clock units for initiating digit-shifting operations within the registers, a machine control unit, and means for connecting units to key-operated switches of a keyboard and to power supply means and to the machine control unit, whereby the apparatus when initially set into operation does thereafter automatically and by a series of asynchronously timed operating steps perform a conformity check of a number registered in a value-indicating and storage means such as the key switches of a keyboard, with a particular mathematical prescription and provide a unique indication for such conformity or non-conformity. The apparatus components required are substantially all solid-state and such as to consume only an extremely small amount of power and occupy only a very small space. The exemplary apparatus described may be mounted on a small printed-circuit card or plaque adapted to form a plug-in unit attachable to the power supply unit of the keyboard machine, and thus does not add appreciably to the space requirements of the machine as an entirety.

It is to be noted that a number when entered into the input register of a machine by the process of depression of keys, as in the particular example described, is in effect stored in digit-value storage means. The storage means may be the key-actuated switches such as switches 100–199 described, or any other suitable digit-value storage devices which serve to mechanically or electrically register the numerical values of the respective digits of the entered number, it being essential only that the storage means be capable of electrical interrogation in the general manner disclosed.

Further it should be noted that while in the operating units illustrated and described the transistor collector current is passed through a winding linked to the associated core in a direction to aid turn-over of the core, this is not essential. By using the transistor current to aid the core turn-over, the operating time of the unit is shortened and operating characteristics of the unit are enchanced.

Core-transistor-windings units of the type herein disclosed and used are disclosed and claimed in a patent application of Peter S. Glaser et al., filed October 23, 1957, Serial No. 697,927.

It is evident that the use of a bi-quinary register to save hardware is optional, it being evident that a plain recirculating register having units equal in number to a modulus $p$ could be employed to accumulate modulo $p$, the final check pulse (TA2 in the example) interrogating the $q$th unit of the register and the output of that unit in turn operating unit G2 from "1" to "0" contingent on the digit reposing in the $q$th unit at the time of the actual interrogation.

In the explanation of the operation of the exemplary embodiment of apparatus according to the invention, it was made apparent how one type of entry error is detected with the apparatus. Artificial erroneous entries of numbers in which other types of errors are committed may be made, on the diagram of FIGS. 5a and 5b, and the operational steps tabulated in the manner used in the explanation; and thereby proof obtained that the apparatus detects other types of errors in number entry. The particular congruence formula employed, with applied weights of 1 and 2 assigned in alternation as in the example, assures detection of 100% of ordinary transcription errors, and about 90% of other random errors excepting double transcription errors. These percentages may be established both experimentally and by mathematical proofs. The exemplary congruence relationship stated in expression I may be altered and the several groups of operating units revised in number and arranged to perform the congruence test required by the altered prescription, and in this respect, various other weighting-value arrangements employed. For example, using the same modulus, 10, weighting may be done according to a 1, 3, 1, 3, 1, 3 plan, or a 7, 6, 5 4, 3, 2 plan. A 1, 3, 7, 1, 3, 7 plan is an obvious mode of weight assignment. If the modulus is changed, still other congruence relationships may be employed, it being evident that the prescription used may, in order to attain best error-detecting performance, be formulated to take into account the statistical frequency with which each of the various types of entry-errors are committed when a particular type of data is being processed and/or a particular type of machine is being operated.

The exemplary apparatus and procedure were explained with reference to data-processing operations utilizing the decimal system of data representation, but it is evident that the invention is applicable as well to data-processing operations using other data-representation systems such as, for example, alphanumeric, octal, etc.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Self-sequencing asynchronously operating apparatus operating in accordance with a mathematical prescription comprising: means for storing the digits of an information number in accordance with the column positions thereof, an input register, asynchronous scanning and weighting means initiated after storage of said digits for performing a plurality of asynchronous scans of the stored digits of said information number, the number of asynchronous scans performed being chosen in accordance with said mathematical prescription, means coupled to said scanning and weighting means and said storing means for successively setting said input register to settings corresponding to the numerical values of said digits as each digit is scanned, a bi-quinary recirculating accumulator register for progressively counting in response to the settings of said input register in a manner so as to indicate conformance with said mathematical prescription, said input register being constructed and arranged in conjunction with said scanning and weighting means so that the next digit of said information number is scanned in response to the input register having advanced the accumulator register to a count in accordance with the numerical value of the previous digit set up in said input register, whereby the scanning of the stored digits is performed in a self-sequencing manner, modifying means for adding at least one additional count to said accumulator in addition to that provided as a result of the operation of said scanning and weighting means during at least one scan of a digit whose numerical value is equal to any one of a plurality of predetermined numerical values, and means coupled to said accumulator register and initiated after completion of scanning by said scanning and weighting means to determine the relationship of the count of said accumulator to said mathematical prescription, taking into account any modification introduced by said modifying means.

2. Self-sequencing asynchronously operating apparatus operating in accordance with a modifiable mathematical prescription of the form $$\sum_{i=1}^{i=n} d_i W_i \equiv q \bmod. 10$$

wherein $n$ is the number of significant digit positions in each information number, $d_i$ are numerical values representing the digits making up an information number, $w_i$ are numerical values representing the weights to be assigned to the respective columns of an information number, and $q$ is a selected whole number less than 10 and including zero, said apparatus comprising: keyboard means for storing the digits of said information number in accordance with the column positions thereof, an input register, asynchronous scanning means initiated after storage of said digits for asynchronously scanning the stored digits, means coupled to said scanning means and said keyboard storing means for successively setting said input register to settings corresponding to the numerical values of said digits as each digit is scanned, a bi-quinary recirculating accumulator register coupled to said input register so as to operate asynchronously therewith, said accumulator register being constructed and arranged to progressively count in response to the numerical value of each digit set up in said input register in a manner so as to provide a count representative of mod. 10, said scanning means being constructed and arranged in conjunction with said input register so that the next digit of said information number is scanned in response to the input register having advanced the accumulator register to a count in accordance with the numerical value of the previous digit set up in said input register, whereby the scanning of the stored digits is performed in a self-sequencing manner, weighting means coupled to said scanning means and responsive to the completion of a scan by said scanning means for causing at least one additional scan of at least predetermined ones of said stored digits in accordance with the column weighting $w_i$ of each digit of said information number, modifying means for adding at least one additional count to said accumulator in addition to that provided as a result of the operation of said scanning means and said weighting means during at least one scan of a digit whose numerical value is equal to any one of a plurality of predetermined numerical values, and means initiated after completion of scanning for interrogating said accumulator register to determine the relationship of the count of said accumulator register to said mathematical prescription, taking into account any modification introduced by said modifying means.

3. The invention in accordance with claim 2, wherein each of said registers includes a plurality of bistable units, each unit comprising a bistable magnetic element having windings inductively linked thereto, and a transistor connected to pass current through one of said windings upon triggering of said transistor.

4. Self-sequencing asynchronously operating apparatus operating in accordance with a mathematical prescription comprising: means for storing the digits of an information number in accordance with the column positions thereof, an input register, asynchronous scanning and weighting means initiated after storage of said digits for performing a plurality of asynchronous scans of the stored digits, the number of asynchronous scans performed being chosen in accordance with said mathematical prescription, means coupled to said scanning and weighting means and said storing means for successively setting said input register to settings corresponding to the numerical values of said digits as each digit is scanned, a recirculating accumulator register for progressively counting in response to the settings of said input register in a manner so as to indicate conformance with said mathematical prescription, said input register being constructed and arranged in conjunction with said scanning and weighting means so that the next digit of said information number is scanned in response to the input register having advanced the accumulator register to a count in accordance with the numerical value of the previous digit set up in said input register, whereby the scanning of the stored digits is performed in a self-sequencing manner, modifying means for adding an additional count to said accumulator register during at least one scan of a digit whose numerical value is equal to any one of a plurality of predetermined numerical values, and means coupled to said accumulator register and initiated after completion of scanning by said scanning and weighting means to determine the relationship of the count of said accumulator register to said mathematical prescription, taking into account any modification introduced by said modifying means.

5. The invention in accordance with claim 4, wherein said scanning and weighting means are constructed and arranged so that the columns of said information number are alternately weighted 1 and 2 with those digits in columns weighted 1 being scanned once and those digits in columns weighted 2 being scanned twice, and wherein said modifying means acts to cause said accumulator register to advance an additional count when a digit in a column weighted 2 has numerical value from 5 to 9 inclusive.

6. In apparatus operating in accordance with a prescribed mathematical congruence, the combination of: means for storing the digits of an information number in accordance with the column positions thereof, a plurality of registers including a scanning register, a weighting register, an input register, and an accumulator register, each register including a plurality of bistable units, a plurality of control devices for controlling the operation of said registers including a scanning register control device associated with said scanning register, a weighting register control device associated with said weighting register, an input register control device associated with said input register, and an accumulator register control device associated with said accumulator register, each of said control devices including a bistable unit which is normally biased to one of its two bistable states, means connecting said scanning, weighting and input registers and the respective control devices associated therewith so that after storage of said digits a plurality of asynchronous self-sequencing scans are made of the stored digits in a manner so that each digit is set up in said input register in response to the scanning thereof, the number of asynchronous scans performed being chosen so that each digit is scanned a number of times equal to the weighting assigned to the column position thereof, means connecting said input register and said accumulator register and the respective control devices associated therewith so that the count of said accumulator register is advanced in accordance with the numerical value of each digit set up in said input register, the number and arrangement of the bistable units of said accumulator being chosen so that the count thereof is representative of said prescribed mathematical congruence, modifying means for adding an additional count to said accumulator register during at least one scan of a digit whose numerical value is equal to any one of a plurality of predetermined numerical values, and means initiated after all of the scans have been completed to determine the relationship of the count of said accumulator register to said mathematical congruence, taking into account any modification introduced by said modifying means.

7. The invention in accordance with claim 6, wherein said modifying means includes at least one additional register and at least one additional control device associated therewith.

8. In apparatus operating in accordance with a prescribed mathematical congruence, the combination of: an input register having a plurality of successive settings chosen in accordance with the number system of the digits of an information number, a recirculating bi-quinary accumulator register having a plurality of settings chosen in accordance with said prescribed mathematical congruence so as to indicate conformance therewith, each of said registers being constructed and arranged so that the application of an interrogating signal thereto causes the register to advance to its next setting and in so doing to produce an output signal, an input register control device and an accumulator register control device, each being constructed and arranged to provide a delayed output signal in response to an input signal applied thereto, first means coupling said registers and said control devices so that the delayed output signals from said input register control device and said accumulator register control device are respectively applied as interrogating signals to said accumulator register and said input register, second means coupling said registers and said control devices so that the output signals from said input register and said accumulator register are applied as input signals to said accumulator register control device and said input register control device respectively, means for setting said input register to a setting in accordance with a digit of said information number and for applying an initiating input signal to said input register control device in response to the setting of said input register, whereupon said registers and control devices will alternately advance in an asynchronous self-sequencing manner, modifying means for adding an additional count to said accumulator register during at least one scan of a digit whose numerical value is equal to any one of a plurality of predetermined numerical values, and means coupled to said input register for initiating the setting of said input register to the next digit of said information number when said input register advances to a predetermined setting, whereby self-sequencing operation of said apparatus is obtained.

9. The invention in accordance with claim 8, wherein said modifying means includes a first register for distinguishing digits having said predetermined numerical values, and a second register cooperating with said first register to add an extra count to said accumulator register during at least one scan of each digit whose numerical value is one of said predetermined numerical values, and at least one control device associated with said first and second registers for initiating scanning of the next digit after the extra count has been added to said accumulator register.

10. The invention in accordance with claim 2, wherein said bi-quinary recirculating accumulator register includes five bistable stages the settings of which are capable of representing five counts, and two bistable stages for indicating whether the settings represented by said five bistable stages is within the range of numerals 0 to 4 or numerals 5 to 9.

References Cited by the Examiner
UNITED STATES PATENTS

| | | | |
|---|---|---|---|
| 2,754,054 | 7/1956 | Heelmig et al. | 235—153 |
| 2,886,240 | 5/1959 | Linsman | 235—153 |
| 3,040,895 | 6/1962 | Glaser et al. | 235—153 |

ROBERT C. BAILEY, *Primary Examiner.*

DARYL W. COOK, MALCOLM A. MORRISON,
*Examiners.*